United States Patent
Hueber

(10) Patent No.: US 7,429,190 B2
(45) Date of Patent: Sep. 30, 2008

(54) POWER DISTRIBUTION SYSTEM FOR SUPPLYING A RAIL-MOUNTED MONUMENT IN AN AIRCRAFT WITH ELECTRIC POWER

(75) Inventor: Stefan Hueber, Stade (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/200,939

(22) Filed: Aug. 10, 2005

(65) Prior Publication Data
US 2006/0035518 A1    Feb. 16, 2006

Related U.S. Application Data

(60) Provisional application No. 60/600,922, filed on Aug. 12, 2004.

(30) Foreign Application Priority Data

Aug. 12, 2004    (DE) ........................ 10 2004 039 189

(51) Int. Cl.
*H01R 13/60* (2006.01)
(52) U.S. Cl. .................................................. 439/532
(58) Field of Classification Search ................ 439/416, 439/532; 340/310, 65.13
See application file for complete search history.

(56) References Cited

U.S. PATENT DOCUMENTS

| 2,761,047 A | 8/1956 | Meredith ..................... 219/10 |
| 3,553,675 A | 1/1971 | Shaver et al. ............... 340/310 |
| 4,486,647 A | 12/1984 | Kuusinen et al. ............ 219/137 |
| 4,708,549 A | 11/1987 | Jensen ........................ 410/105 |
| 4,763,360 A | 8/1988 | Daniels et al. ................. 455/3 |
| 4,853,555 A * | 8/1989 | Wheat .......................... 174/82 |
| 6,099,344 A * | 8/2000 | Chadbourne ................ 439/416 |
| 2003/0132346 A1 | 7/2003 | Lambiaso ................ 244/118.6 |

FOREIGN PATENT DOCUMENTS

| DE | 198 51 392 A1 | 5/1999 |
| EP | 0 260 726 A2 | 3/1988 |
| GB | 1 237 090 | 6/1971 |
| GB | 2 314 012 | 12/1997 |

OTHER PUBLICATIONS

European Search Report. 7 pages.

* cited by examiner

*Primary Examiner*—Briggitte R Hammond
(74) *Attorney, Agent, or Firm*—Ostrolenk, Faber, Gerb & Soffen, LLP

(57) ABSTRACT

The present application describes a power distribution system for supplying a rail-mounted monument in an aircraft with electric power. The power distribution system contains a seat rail that comprises an insulated first conductor, at which a current can be tapped with the aid of a locking bolt comprising a second conductor. The power distribution system simplifies the supply of electric power to a rail-mounted monument in an aircraft.

13 Claims, 5 Drawing Sheets

POWER DISTRIBUTION SYSTEM FOR SUPPLYING A RAIL-MOUNTED MONUMENT IN AN AIRCRAFT WITH ELECTRIC POWER

REFERENCE TO RELATED APPLICATIONS

This application claims the benefit of the filing date of U.S. Provisional Patent Application No. 60/600,922 filed Aug. 12, 2004, the disclosure of which is hereby incorporated herein by reference and the benefit of the filing date of German Patent Application No. 10 2004 039 189.0 filed Aug. 12, 2004, the disclosure of which is hereby incorporated herein by reference.

FIELD OF THE INVENTION

The present invention pertains to the power distribution in an aircraft. In particular, the present invention relates to a power distribution system for supplying a rail-mounted monument in an aircraft with electric power, a seat rail, a locking bolt, a clamping fixture, as well as a method for installing and removing a rail-mounted monument in an aircraft.

BACKGROUND OF THE INVENTION

In the construction of aircraft, a lightweight design is of the utmost importance. Any element that is unnecessarily carried along in-flight increases the fuel consumption and occupies additional space. Consequently, it is desirable to realize comfort features and services offered to the passengers with the least weight and space requirement possible. Such comfort features include, for example, the illumination or the entertainment media at the passenger seats, as well as the preparation of meals for the passengers in on-board kitchens. These types of comfort features usually require that electricity be available at the site of the consumer. However, electricity is only provided at a central location in an aircraft and consequently needs to be distributed to the respective consumers from this central location.

The floor of an aircraft consists of metal struts that are mounted on the fuselage and covered with floor plates. Since floor plates alone frequently do not provide the required stability, monuments that need to be solidly connected to a base, for example, seats, kitchens or toilets, cannot be arranged at arbitrary locations on the floor of the aircraft. Consequently, specially designed seat rails are provided in the floor of the aircraft in order to install monuments that require a high stability. The monuments are connected to the seat rails and sufficiently stabilized in this fashion.

If electricity is required at a monument, cables usually need to be installed from the central power supply of the aircraft to the consumer. Since these cables should not be visible, they can usually not be installed along the shortest and most direct route, but rather need to be tediously concealed behind the paneling. In addition, the position of the connecting points on the monuments is not always clearly defined such that the installed cables frequently have an "excess length" that increases the weight and the space requirement. The required plug connectors can also lead to malfunctions and are frequently difficult to access. This is the reason why their removal and, if applicable, repair is quite time-consuming. It may also occur that it is neglected to separate the plug connectors when the monuments are removed. This can result in plug connectors being torn off cables such that the corresponding repairs consume additional time.

SUMMARY OF THE INVENTION

An exemplary embodiment of the present invention relates to a power distribution system for supplying a rail-mounted monument in an aircraft with electric power. The power distribution system comprises a seat rail, a locking bolt and a clamping fixture. In this case, the seat rail comprises a first conductor that is provided with an insulation. The insulation is arranged between the first conductor and the mounting rail. The clamping fixture is designed in such a way that it is fixed on the seat rail with the aid of the locking bolt. The locking bolt comprises a second conductor that is realized such that it can contact the first conductor.

An electric potential relative to the surroundings can be advantageously realized in the seat rail and, in particular, in the first conductor. This electric potential can be tapped at any arbitrary location of the seat rail with the aid of the second conductor. The second conductor can be fixed in a certain position on the seat rail with the locking bolt and the clamping fixture and thusly secured from being displaced. This position can be chosen in increments of an inch-grid. Consequently, it is possible to apply a potential to a certain location along the seat rail without having to install a cable to this location. The potential can be applied to the respective location without having to provide cables that have an excess length and would unnecessarily increase the weight and the space requirement. The integration of the first conductor into the existing seat rail can reduce the space requirement. In addition, the installation time is reduced because it is not necessary to calculate any cable lengths. Changes of the installation position relative to the cables can be realized much easier because it is not necessary to install any new cables. This also increases the flexibility.

According to another exemplary embodiment of the invention, the locking bolt is designed for mounting a monument on the seat rail. This may makes it possible to mount a monument on the seat rail and to secure the monument from being displaced while simultaneously supplying the monument with a potential via the second conductor of the locking bolt.

According to another exemplary embodiment of the invention, the first conductor has a surface that is covered by an insulating sheath.

The potential applied to the first conductor is advantageously insulated relative to its surroundings. This may make it possible to prevent unintentional contact with a conductor that is connected to a different potential and could lead to a short-circuit. By sheathing the surface of the first conductor with an insulation it may be avoided that passengers contact the potential of the first conductor and are injured by an electric shock.

According to another exemplary embodiment of the present invention, the second conductor has a first end that is realized in the form of a point. The point is designed such that it is able to pierce the insulation of the first conductor, wherein the point protrudes over a second end of the locking bolt.

When the monument is mounted on the seat rail, the locking bolt with the protruding point is pressed against the insulation of the first conductor, wherein the pressure causes the point to pierce the insulation of the first conductor. This means that the first and the second conductor can contact one another in order to produce an electrical connection. The second conductor therefore receives the same potential as the first conductor that can be used for supplying the consumer with power, e.g., in a monument. In order to realize the power supply, the consumer needs to be connected to the third potential, for example, that of a third conductor. The third conductor could be realized, for example, in the form of the conductor of another seat rail according to the present invention. The advantages of such an arrangement can be seen, for example, in that monuments installed in this fashion can be immediately connected to the power supply. Since no new cables are required for realizing the power supply, such an arrangement increases the flexibility, for example, when the cabin is remodeled. An arrangement of this type also makes it possible to eliminate plug connectors that are susceptible to defects. Malfunctions caused by torn cables, e.g., during the removal of a monument, can also be prevented.

According to another exemplary embodiment of the present invention, the second conductor has a third end that is designed for being connected to a consumer. It would be possible, for example, to provide a contact pin (Jiffy) that can be connected to a consumer service cable.

The connection between a consumer and the second conductor may be standardized in this fashion. The utilization of standard components makes it possible to ensure a less expensive manufacture of the components, as well as a faster installation thereof because no individual adaptations are required.

Another exemplary embodiment of the present invention relates to a seat rail that comprises a first conductor with an insulation arranged thereon. In this case, the insulation can be arranged between the first conductor and the seat rail. The first conductor may advantageously have a different potential than the surroundings, particularly the seat rail. Consequently, the integrated first conductor can be used for supplying a consumer with power.

Another exemplary embodiment of the present invention relates to a clamping fixture that can be clamped on a seat rail by means of a locking bolt during the mounting process. Since the clamping fixture and the seat rail are clamped together, frictional forces are advantageously generated between the clamping fixture and the seat rail and prevent the clamping fixture from being displaced on the seat rail. A monument mounted with the aid of the locking bolt can be stabilized in this fashion.

According to another exemplary embodiment of the present invention, the clamping fixture is designed for positioning the locking bolt above a first conductor.

The locking bolt may contain a second conductor, the first end of which is realized in the form of a point for contacting the first conductor. The position of the locking bolt above the first conductor simplifies the contacting of the first conductor with the point of the second conductor.

Another exemplary embodiment of the present invention relates to a method for connecting a monument to a power distribution system for supplying rail-mounted monuments in an aircraft with electrical power. In this case, the clamping fixture is arranged at the mounting position of a monument on a seat rail. After the monument is connected to the clamping fixture by means of the locking bolt, the monument is mounted on the seat rail with the aid of the clamping fixture and the locking bolt. The clamping fixture is then clamped to the seat rail such that the insulation of the first conductor is pierced by the point of the second conductor. This may make it possible for the first conductor to contact the second conductor, wherein the second conductor can subsequently be connected to a consumer that can ultimately be connected to a third conductor.

This method may make it possible to supply a consumer with power in a wireless fashion. Consequently, it is no longer necessary to utilize cables.

Another exemplary embodiment of the present invention relates to a method for disconnecting monuments from a power distribution system. The connection between the locking bolt and the clamping fixture is initially separated such that the first conductor can be disconnected from the second conductor. The monument can then be separated from the clamping fixture and the locking bolt. The hole in the insulation produced by the point of the second conductor is then filled with insulating material.

This may make it possible to remodel the cabin in a more flexible fashion and to continue using the power distribution system.

SHORT DESCRIPTION OF THE DRAWINGS

Embodiments of the present invention are described in greater detail below with reference to the figures.

DESCRIPTION OF PREFERRED
EMBODIMENTS OF THE INVENTION

Figure 1:
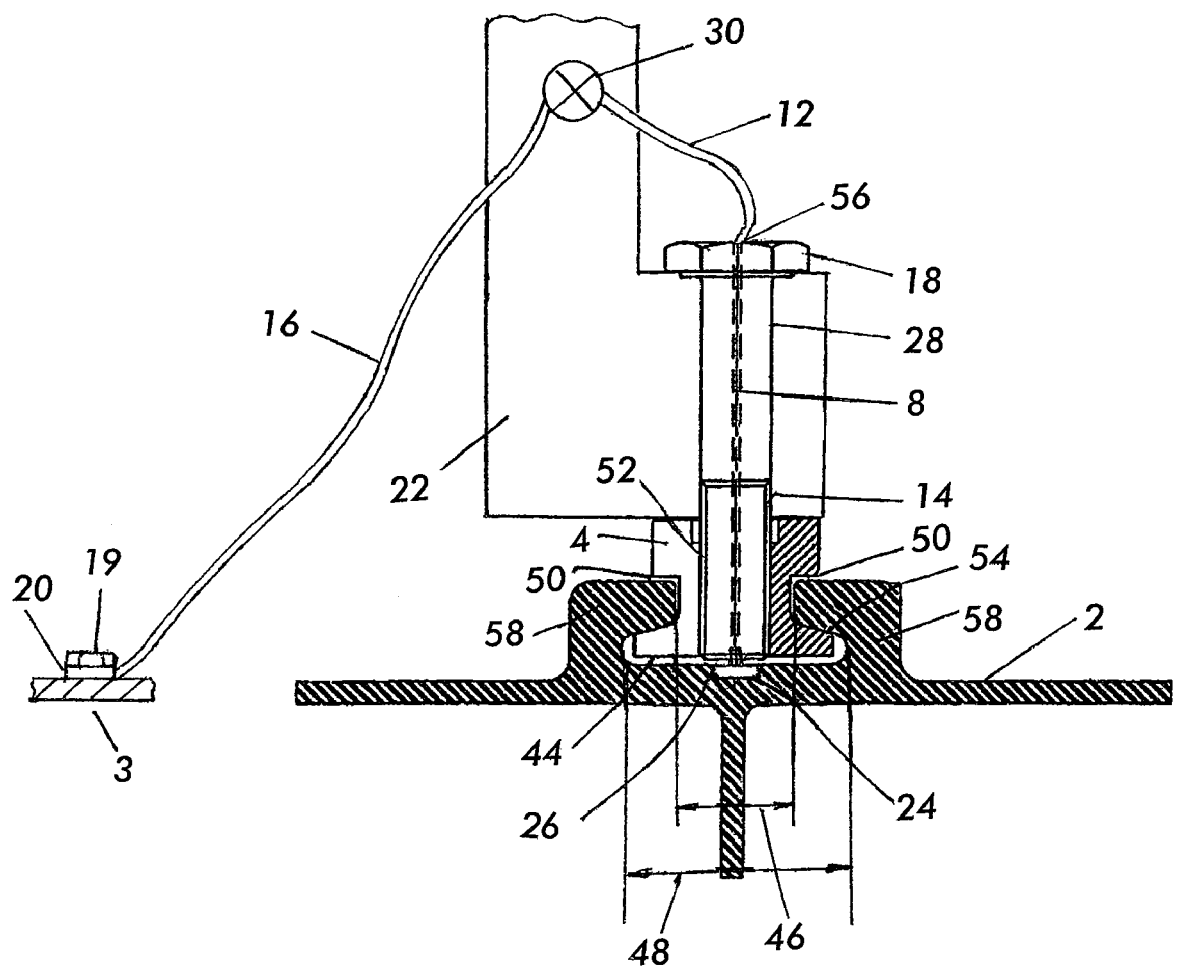
FIG. 1 shows a schematic sectional view through a power distribution system according to a first exemplary embodiment of the present invention.

FIG. 1 shows a schematic section through a power distribution system according to an exemplary embodiment of the present invention. This figure shows how a monument 22 is mounted on a seat rail 2 by means of a locking bolt 28 and a clamping fixture 4. The seat rail 2 has a T-shaped profile. This T-shaped profile increases the stability and sufficiently strengthens the seat rail 2 for connecting a plurality of monuments 22. On its upper side, the seat rail 2 contains hook-shaped elevations 58 that are arranged centrally in a symmetric fashion and extend over the entire length of the seat rail that points into the plane of projection. The hook-shaped elevations 58 of the seat rail 2 define a T-shaped gap with a first dimension 48 and a second dimension 46, wherein the first dimension 48 is greater than the second dimension 46. The clamping fixture 4 has a rectangular cross section. The rectangular cross section is symmetrically interrupted on its sides by notches 50. Consequently, the side of the base 44 of the clamping fixture 4 that lies in the plane of section has a dimension that is greater than the dimension of the clamping fixture at the location of the notch 50. The arrangement of the notch 50 causes the notch to cooperate with the hook-shaped elevations 58 of the seat rail 2 in such a way that the clamping fixture 4 can be longitudinally displaced on the seat rail 2. Any lateral or vertical movement relative to the surface of the seat rail 2 is prevented by the hook-shaped elevations 58. The clamping fixture 4 therefore can only be moved along the rail 2 into and out of the plane of projection while any deviation from this linear movement is very difficult. The movement in the longitudinal direction is achieved in that the notch 50 has a slightly greater dimension than the hook-shaped part of the elevations 58 of the seat rail 2 that is engaged with the notch. The clamping fixture can be positioned on the seat rail 2, for example, in increments of an inch-grid. For this purpose, the seat rail 28 may contain recesses 62 with a size that corresponds to that of the base 44 of the clamping fixture, wherein the clamping fixture 4 can be inserted into the seat rail 2 at this location through said recesses. The hook-shaped extensions of the elevations 58 of the seat rail 2 are removed at these locations.

The conductor 24 is arranged centrally on the surface of the seat rail 2 such that it is spaced apart from the base 44 of the clamping fixture 4. The conductor 24 has a rectangular cross section and is arranged parallel to the elevations 58 along the seat rail 2. The conductor 24 consists of an electrically conductive material such as copper. This makes it possible to conduct an electric current. The conductor 24 is sheathed by an insulating layer 26 such that the conductor 24 can be electrically separated from the seat rail 2. Otherwise, a potential equalization could take place if the conductor 24 comes in contact with another potential. The thusly created short-circuit would disconnect the consumer from the power supply. The insulation 26 surrounds the entire surface of the conductor 24 and makes it possible to realize a difference potential relative to the surroundings. The conductor 24 is arranged in the seat rail 2 together with the insulation 26 in such a way that the surface of the insulation 26 lies in the same plane as the surface of the seat rail 2. This makes it possible to conceal the copper conductor 24 behind the insulation 26, wherein the conductor 24 that may have an electric potential is simultaneously protected from being accidentally contacted. This increases the safety of the passengers. Due to its rectangular design, the conductor 24 has four sides, two of which respectively have the same width, i.e., two sides are wider than the other two sides. It is advantageous to arrange the conductor and its insulation in such a way that one of the wider sides of the conductor is situated on the upper surface of the seat rail 2. A conductor 24 and an insulation 26 may also be arranged in existing seat rails 2, for example, by means of a milling process. Existing seat rails can be retrofitted in this fashion.

A thread 52 is centrally arranged perpendicular to the base 44 of the clamping fixture 4 and engaged with the thread 14 of the locking bolt 28 that is realized in the form of a screw in FIG. 1. The thread 14 extends over half the length of the locking bolt 28. The length of the thread 14 exceeds the height of the clamping fixture 4. The process of screwing in the locking bolt can be simplified by realizing its head 18 in the form of a hexagon. This makes it possible to manipulate the locking bolt 28, for example, with a standard open-end wrench. When the locking bolt 28 is screwed into the thread 52, the locking bolt 28 moves in the direction of the surface of the seat rail 2. The locking bolt 28 has a first length between its head 18 and the clamping fixture 4. This first length is shortened by screwing the locking bolt 28 into the clamping fixture 4 with the aid of the threads 52 and 14. This shortening of the first length can be used for clamping and fixing a monument 22 between the clamping fixture 4 and the head 18 of the locking bolt. A washer may be inserted between the monument 22 and the head 18 of the locking bolt in order to protect the monument from being damaged.

A point 6 is arranged on the opposite end of the locking bolt 28 referred to its head 18. This point moves in the direction of the surface of the seat rail 2, particularly in the direction of the insulation 26 surrounding the conductor 24, when the monument is fixed in position. The point 6 ultimately contacts the insulation 26. As the locking bolt 28 is additionally moved toward the surface of the seat rail 2, the point 6 pierces the insulation 26 and contacts the conductor 24 arranged thereunder. The adjustability of the locking bolt 28 could be improved by supporting the point 6 on a spring such that the distance between the locking bolt 28 and the conductor 24 can be adjusted in a more precise fashion.

The point 6 is realized in the form of an extension of a second conductor 8 that is encompassed by the locking bolt 28. Since the conductor 24 and the point 6 are respectively manufactured of a conductive material, a potential equalization could take place between these two components.

The clamping fixture 4 is pressed away from the upper side of the seat rail 2 on the underside 54 of the hook-shaped elevations 58 of the seat rail 2 due to the movement of the locking bolt 28 in the direction of the surface of the seat rail 2 and the contact with of the conductor 24.

This results in frictional forces being generated between the clamping fixture 4 and the seat rail 2 such that the clamping fixture 4 is prevented from moving in the longitudinal direction of the seat rail 2. This means that the monument 22 mounted by means of the locking bolts 28 is fixed in position.

The point 6 of the copper core 8 protrudes from the locking bolt 28, e.g., by 1.5 mm on the opposite end of the locking bolt 28 referred to the head 18. A contact pin 56 that is conductively connected to the copper core 8 of the locking bolt 28 is realized on the copper core 8 laterally of the head 18. A conductor 12 that is connected to a consumer 30 can be hard-wired to the contact pin 56 or connected thereto by means of plug connectors. The consumer 30 forms part of the monument 22. Due to the fixed assignment of the consumer 30 to the monument 22, the wiring 12 can also be prepared accordingly such that it is merely required to produce a connection with the contact pin 56 during the installation. This accelerates the installation and cables no longer have to be laboriously installed from the power source to the consumer 30. A conductor 16 that is connected to a second potential, for example, by means of a cable lug 20 and a screw 19, leads away from the consumer 30. Consequently, it is possible to close an electric circuit, for example, from a battery 40 to the consumer 30 via the conductor 24, the point 6 and the copper core 8, the contact pin 56 and the service cable 12 and from the consumer back to the battery 40 via the cable 16, the cable 20 and the third conductor 3. It would also be conceivable to utilize another conductor 24 of another seat rail for the return circuit back to the battery 40 via the cable 16. A consumer can be quickly and flexibly connected to a power source 40 in an aircraft by utilizing the conductor 24 arranged in the seat rail 2. This means that the monument 22 can be quickly connected to the power supply 40.

Figure 2:
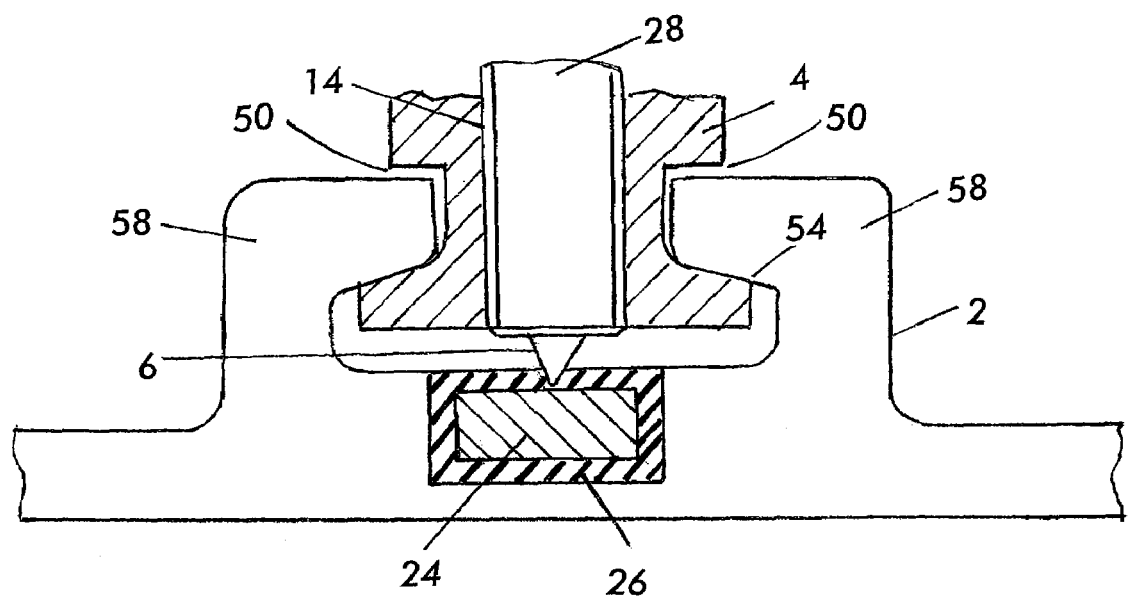
FIG. 2 shows a detailed sectional view through the connection between two conductors according to another exemplary embodiment of the present invention.

FIG. 2 shows a detailed sectional view through an exemplary embodiment of the present invention. Analogous to FIG. 1, FIG. 2 shows the seat rail 2 and the locking bolt 28 with the point 6 that can be displaced in the clamping fixture 4 with the aid of a thread 14. In FIG. 2, the locking bolt 28 is screwed into the clamping fixture 4 by such a distance that the point 6 has pierced the insulation 26 and contacted the conductor 24. The insulation 26 has a thickness that is smaller than the length of the point 6. The thread 14 exerts pressure upon the clamping fixture 4 due to the pressure that presses the point 6 against the conductor 24. This pressure causes the clamping fixture 4 to move away from the surface of the seat rail 2. The hook-shaped elevations 58 of the seat rail 2 engage with the notch 50 of the clamping fixture 4. The pressure that moves the clamping fixture 4 away from the surface of the seat rail 2 presses one side of the notch 50 against the underside 54 of the hook-shaped elevations 58 on the seat rail 2. The thusly generated frictional forces prevent the clamping fixture 4 from being moved parallel to the seat rail 2.

Figure 3:
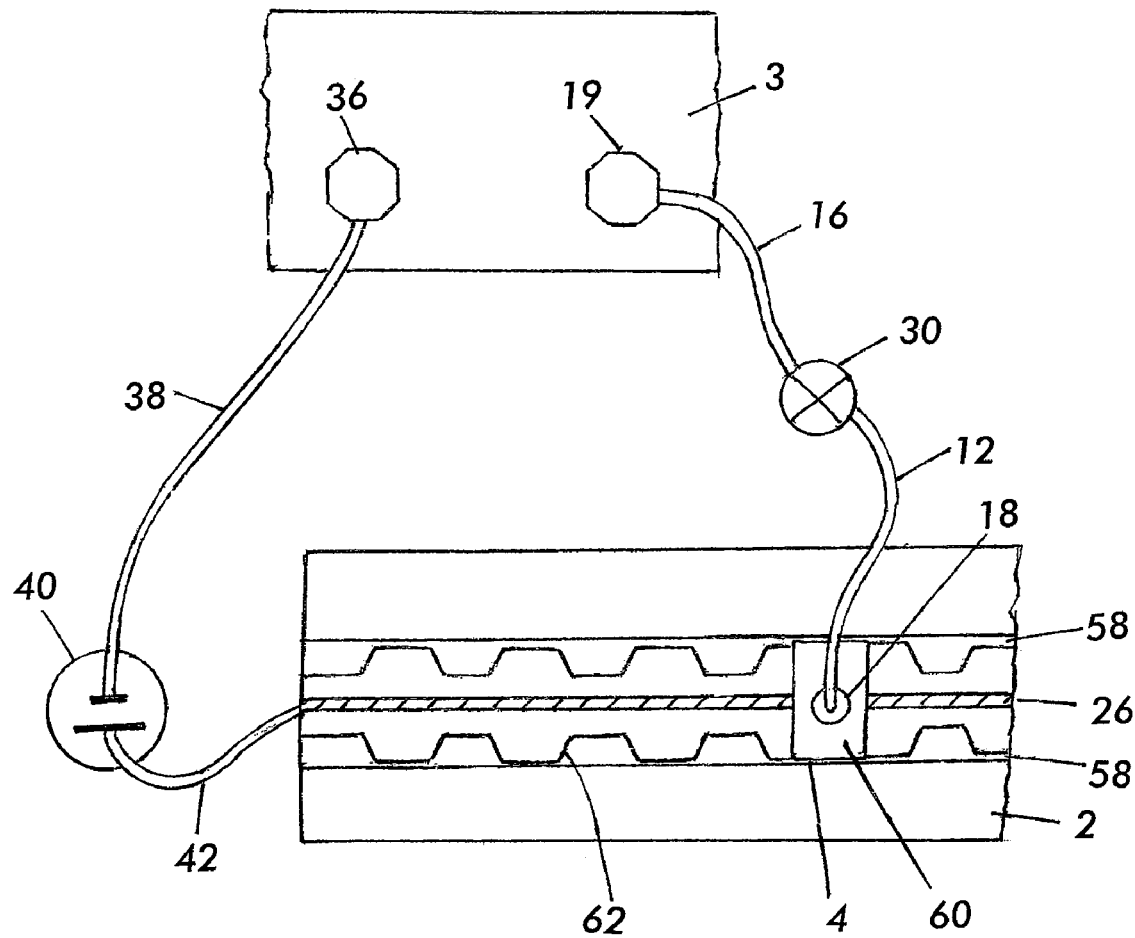
FIG. 3 shows a schematic representation of an electric circuit according to another exemplary embodiment of the present invention.

FIG. 3 shows a schematic representation of an electric circuit according to an exemplary embodiment of the present invention. FIG. 3 shows a section through the seat rail 2. The hook-shaped elevations 58 of the seat rail 2 form a guide for the clamping fixture 4. The clamping fixture 4 can be moved parallel to the hook-shaped elevations 58 of the seat rail when no pressure is exerted upon the surface of the seat rail 2 by the locking bolt 28. Interruptions 62 of the hook-shaped elevations 58, the width of which is greater than the width 60 of the clamping fixture 4, make it possible to engage and disengage the clamping fixture 4 in/from the seat rail 2 without having to displace the clamping fixture 4 over the entire length of the seat rail 2. The interruptions 62 may be arranged in accordance with an inch-grid.

After the clamping fixture 4 is fixed on the seat rail 2 by means of the locking bolt 28, the supply line 12 leading to the consumer 30 and the conductor 24 arranged underneath the insulation 26 are contacted via the point 6, the copper core 8 and the contact pin 56. The conductor 24 is connected to a potential of the power supply 40 via a supply line 42. Consequently, the supply line 42, the conductor 24, the core of the locking bolt 8 and the supply line leading to the consumer 12 have the same potential. The supply line 12 is connected to the consumer 30 via a line 16 leading from the consumer to a cable lug 20 that is fixed on the third conductor 3 with the aid of the screw 19. The third conductor 3 consists of conductive material and is connected to the screw 36 that, in turn, is connected to the power source 40 via the line 38. This means that the line 16, the cable lug 20, the screw 19, the third conductor 3, the screw 36 and the line 38 serve for conducting the current away from the consumer 30. This arrangement makes it possible to flexibly connect the consumer 30 to the power source 40.

Figure 4:
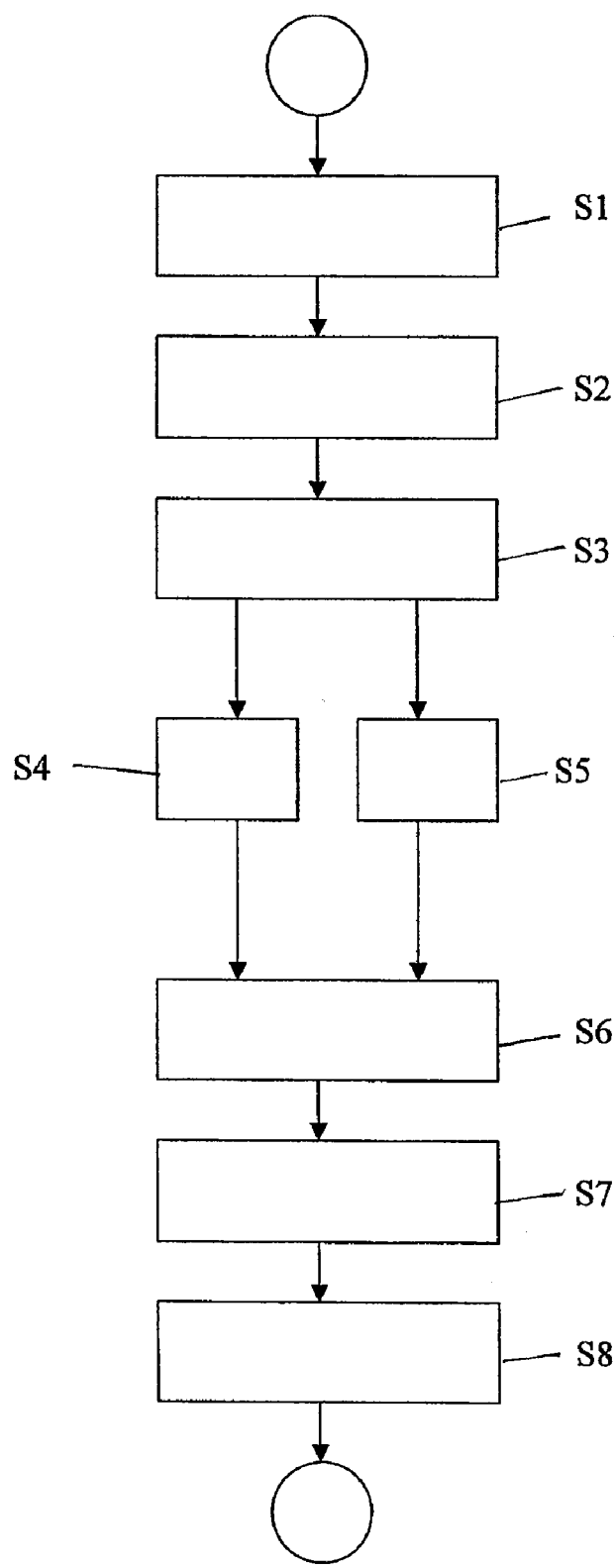
FIG. 4 shows a flow chart of a method for connecting a monument to a power distribution system according to an exemplary embodiment of the present invention.

FIG. 4 shows a flow chart of a method for connecting a monument 22 to a power distribution system according to an exemplary embodiment of the present invention. In a first step S1, the clamping fixture 4 is positioned on the seat rail 2 at the location at which a monument 22 should be installed. After the correct location is determined, the monument 22 is connected to the clamping fixture 4 by means of the locking bolt 28 in step S2. In step S3, the monument 22 is mounted on the seat rail 2 by means of the clamping fixture 4 and the locking bolt 28. At this point, it is still possible to precisely adjust the position of the monument 22 one last time. The clamping fixture 4 is clamped to the seat rail 2 in step S4 by tightening the locking bolt 8. This prevents the clamping fixture 4 from moving on the seat rail 2. When the clamping fixture is clamped to the seat rail, the insulation 26 is simultaneously pierced by the point 6 of the second conductor 8 that is realized in the form of a copper core 8 of the locking bolt 28 in step S5. After the insulation 26 is pierced, the first conductor 24 and the second conductor 8 contact one another as shown in S6. The consumer 30 is subsequently connected to the second conductor 8 via a service cable 12 in step S7. In order to close the electric circuit, the consumer 30 is connected to the third conductor 3 that, in turn, is connected to the power source 40 via the cable 16 in step S8.

Figure 5:
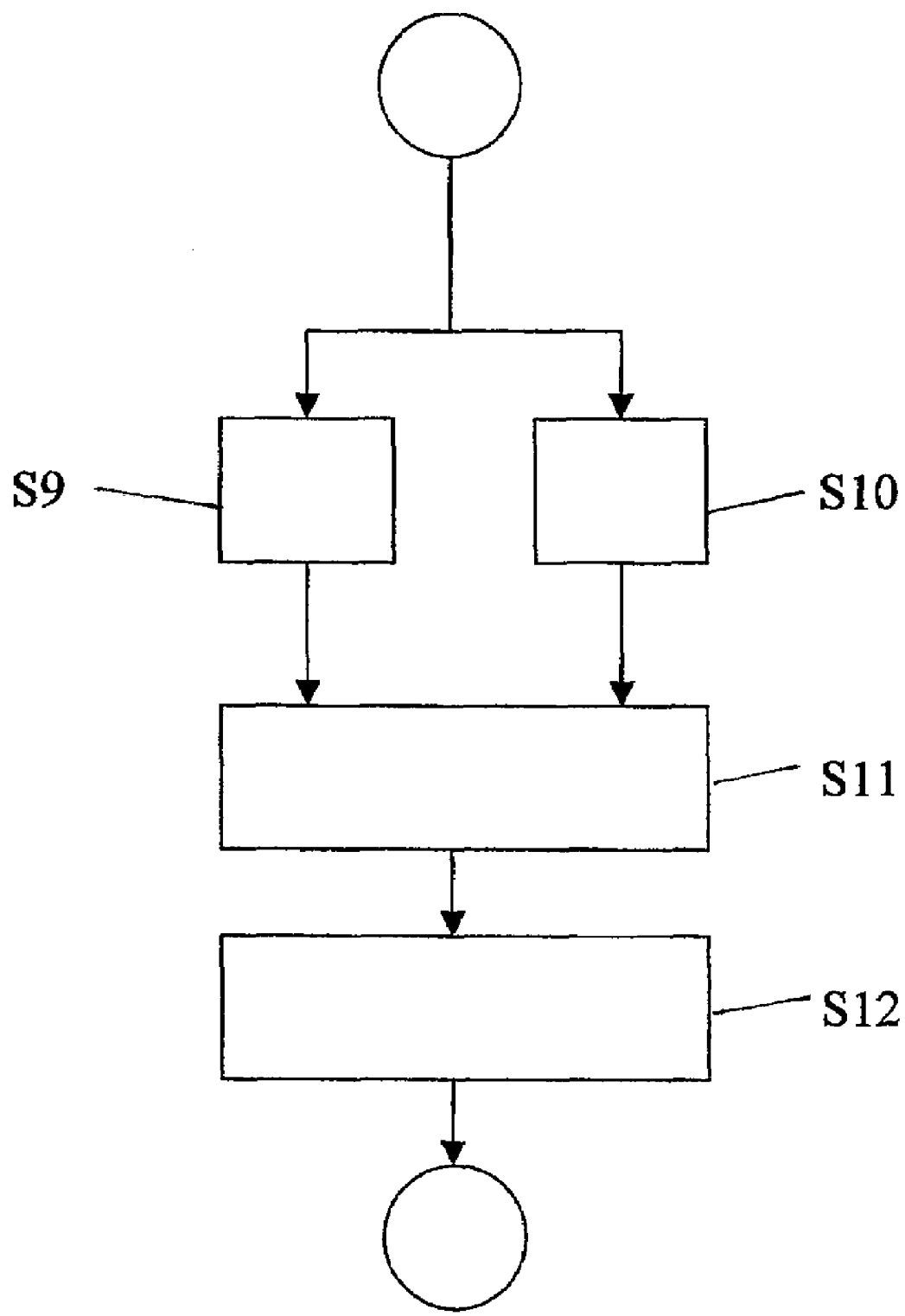
FIG. 5 shows a flow chart of a method for disconnecting a monument from a power distribution system according to an exemplary embodiment of the present invention.

FIG. 5 shows a flow chart of a method for disconnecting a monument 22 from a power distribution system according to an exemplary embodiment of the present invention. The connection between the locking bolt 28 and the clamping fixture 4 needs to be separated in step S9 in order to remove the monument. This is realized by unscrewing the locking bolt 28 from the clamping fixture 4. In step S10, the unscrewing of the locking bolt 28 simultaneously separates the connection between the first conductor 24 and the point 6 of the second conductor 8. The monument 22 can be separated from the clamping fixture 4 and the locking bolt 28 in step S11. Since the piercing of the insulation 26 by the point 6 causes a hole to remain in the insulation 26, this hole needs to be filled with insulating material in step S12, for example, in order to prevent short-circuits.

It should be understood that the term "comprising" does not preclude any other elements or steps, and that the terms "one" or "a" do not preclude a plurality of the element referred to. It should also be understood that characteristics or steps that were disclosed in connection with one of the above-described embodiments could also be utilized in combination with other characteristics or steps disclosed in connection with other above-described embodiments. The reference symbols used in the claims should not be understood in a restrictive sense.

What is claimed is:

1. A power distribution system for supplying a rail-mounted monument in an aircraft with electric power, comprising:
    a seat rail having a first conductor with an insulation, the insulation being arranged between the first conductor and the seat rail;
    a locking bolt having a second conductor and a head, the second conductor contacting the first conductor and extending to the head of the locking bolt; and
    a clamping fixture mounted at a selected location on and along the seat rail by the locking bolt.

2. The power distribution system of claim 1, further comprising a monument installed on the seat rail, wherein the locking bolt is operable to install the monument on the seat rail.

3. The power distribution system of claim 1,
    wherein the first conductor has a surface; and
    wherein the insulation sheaths the surface of the first conductor.

4. The power distribution system of claim 1, wherein the locking bolt includes a second end opposite the head and the second conductor includes a first end having a point, the point being operable to pierce the insulation of the first conductor and the point protruding from the second end of the locking bolt.

5. The power distribution system of claim 1, wherein the second conductor has a third end connected to a consumer.

6. The power distribution system of claim 1, wherein the clamping fixture positions the locking bolt above a first conductor.

7. The power distribution of claim 1, wherein the first conductor is embedded in the seat rail.

8. The power distribution system of claim 1, wherein a top surface of the insulation is on the same plane as an inner surface of the seat rail.

9. The power distribution system of claim 1, wherein the second conductor extends from the first conductor through the head of the locking bolt to a consumer.

10. A method of connecting a monument to a power distribution system for supplying rail-monnted monuments in an aircraft with electric power, the method comprising the steps of:
    positioning a clamping fixture at a location at which a monument should be installed on a seat rail;
    connecting the monument to the clamping fixture by a locking bolt having a head and a second conductor;
    mounting the monument on the seat rail by the clamping fixture and the locking bolt;
    clamping the clamping fixture to the seat rail;
    piercing an insulation of a first conductor with a point of the second conductor;
    contacting the first conductor with the second conductor;
    extending the second conductor to the head of the locking bolt; and
    connecting a consumer to the second conductor at the head of the locking bolt.

11. The method of connecting the monument to the power distribution system in accordance with claim 10, further comprising a step of embedding the first conductor in the seat rail prior to piercing the insulation of the first conductor with the point of the second conductor.

12. A method for disconnecting a monument from a power distribution system for supplying rail-mounted monuments in an aircraft with electric power, the method comprising the steps of:

separating a connection between a locking bolt and a clamping fixture, the locking bolt having a head and a second conductor extended to the head;

disconnecting a first conductor from the second conductor severing a supply of electric power to the head of the locking bolt;

separating the monument from the clamping fixture and the locking bolt; and filling a pierced hole created in an insulation of the first conductor with insulating material.

13. A power distribution system for supplying a rail-mounted monument in an aircraft with electric power, comprising:

a seat rail in the aircraft, the seat rail comprising a first conductor and an insulation surrounding the first conductor;

a clamping fixture at the seat rail; and a locking bolt mounting the clamping fixture on the seat rail, the locking bolt comprising a head and a second conductor extending to the head of the locking bolt at one end and contacting, the first conductor at another end.

\* \* \* \* \*